United States Patent
Sparks et al.

(10) Patent No.: US 7,964,100 B2
(45) Date of Patent: Jun. 21, 2011

(54) REMEDIATION OF WASTE WATER

(75) Inventors: Jordan Sparks, Sutter Creek, CA (US); David Vis, Cumming, GA (US)

(73) Assignee: Fog Free Technologies, LLC, North Charleston, SC (US)

( * ) Notice: Subject to any disclaimer, the term of this patent is extended or adjusted under 35 U.S.C. 154(b) by 675 days.

(21) Appl. No.: 12/013,805

(22) Filed: Jan. 14, 2008

(65) Prior Publication Data

US 2008/0169239 A1    Jul. 17, 2008

Related U.S. Application Data

(60) Provisional application No. 60/884,717, filed on Jan. 12, 2007.

(51) Int. Cl.
*C01F 3/00* (2006.01)
(52) U.S. Cl. .................................................. 210/610
(58) Field of Classification Search ........... 210/610–611
See application file for complete search history.

(56) References Cited

U.S. PATENT DOCUMENTS

| | | | |
|---|---|---|---|
| 5,908,473 A | 6/1999 | Weller et al. | |
| 2002/0166813 A1* | 11/2002 | Bartlett | 210/610 |
| 2002/0170857 A1* | 11/2002 | McGrath et al. | 210/610 |
| 2003/0150801 A1* | 8/2003 | Ward et al. | 210/610 |
| 2006/0243662 A1* | 11/2006 | Yim | 210/610 |
| 2007/0272611 A1* | 11/2007 | Steenbakkers et al. | 210/610 |

FOREIGN PATENT DOCUMENTS

| | | |
|---|---|---|
| PL | 157002 B1 | 4/1992 |
| WO | WO 97/43012 A1 | 11/1997 |

OTHER PUBLICATIONS

Klopotek et al., Liquid dishwashing agent, 6001 Chemical Abstracts, vol. 113, No. 8, Aug. 20, 1990.

* cited by examiner

*Primary Examiner* — Chester T Barry
(74) *Attorney, Agent, or Firm* — Kilpatrick Townsend & Stockton LLP

(57) ABSTRACT

A non-toxic waste water treatment composition is provided. The waste water treatment composition is formed from: (a) an alkanolamide; (b) an ethoxylated alkylphenol, ethoxylated aryl phenol, or combination thereof; (c) a first surfactant selected from the group consisting of: an ethoxylated alcohol, a glycerol ester, a propoxylated fatty acid, an ethoxylated fatty acid, a propoxylated alcohol, an ethoxylated alcohol, a propoxylated alkyl phenol, an ethoxylated alkyl phenol, and a combination thereof; (d) a second surfactant selected from the group consisting of: a sulfosuccinate, a sulfosuccinate derivative, an imidazoline, an imidazoline derivative, and a combination thereof; and (e) optionally, a foaming agent. Methods for forming the non-toxic composition and for treating waste water with the composition are also provided. Finally an apparatus for introducing a waste water treatment composition into a waste water system is provided. The apparatus includes tubing for delivering the waste water treatment composition to at least one spray nozzle and a swivel fitting connecting the tubing to the spray nozzle. The spray nozzle is configured to deliver the waste water treatment composition into the waste water system, and the swivel fitting permits 360 degree rotation of the spray nozzle around the tubing.

4 Claims, 2 Drawing Sheets

US 7,964,100 B2

REMEDIATION OF WASTE WATER

CROSS-REFERENCE TO RELATED APPLICATION

This application claims priority to U.S. provisional application Ser. No. 60/884,717 filed on Jan. 12, 2007, the contents of which are incorporated by reference herein in its entirety.

FIELD OF THE INVENTION

This invention relates to non-toxic compositions and associated methods for enhancing the remediation of waste water.

BACKGROUND OF THE INVENTION

Waste water generally contains contaminants such as fat, oil, grease, heavy metals, and other organic and inorganic substances at levels considered hazardous to the environment and which could pose a risk to public health. In addition, these contaminants build up on septic and sewer system components such as pipes, grinder pumps, lift stations and holding tanks, causing clogging and possible overflow of these systems, decreased waste water flow, and increased wear on system components.

Moreover, when contaminants such as fat, oil and grease ("FOG") are introduced into a grease trap, septic tank or waste water treatment plant, or low-flow areas of sewer systems, they have a tendency to coagulate into larger FOG particles. The large FOG particles entrap numerous other contaminants present in the waste water. These larger FOG particles, with a reduced overall surface area as compared to an equal mass of smaller FOG particles, are not treated as efficiently by the bacteria in the septic tank and waste water treatment plant. As a result, remediation efficiency of these systems is substantially degraded.

Prior chemical-based waste water treatment compositions, systems or methods have been only partially effective at preventing or treating the problems described above. Prior chemical treatments have been effective in breaking up FOG particles, but have left residual chemical compounds that either adversely affect operation of the grease trap, septic tank or waste water treatment system, or include additional contaminants which must be removed prior to discharging the treated water into effluent water streams. Moreover, treatments that simply dislodge FOG from the grease trap, septic tank, and sewer systems without physically breaking up the FOG particles can result in clogs or overflows of these systems as the FOG particles recombine downstream.

Accordingly, there is a need for an organic, non-toxic chemical formulation for promoting the remediation of contaminants in waste water streams.

There is also a need for a method for promoting the remediation of waste water streams with an organic, non-toxic chemical composition.

SUMMARY OF THE INVENTION

The problems of currently available chemical compositions and methods for waste water treatment are addressed herein by providing a non-toxic waste water treatment composition formed from:
a) an alkanolamide;
b) an ethoxylated alkylphenol, ethoxylated aryl phenol, or combination thereof,
c) a first surfactant selected from the group consisting of: an ethoxylated alcohol, a glycerol ester, a propoxylated fatty acid, an ethoxylated fatty acid, a propoxylated alcohol, an ethoxylated alcohol, a propoxylated alkyl phenol, an ethoxylated alkyl phenol, and a combination thereof,
d) a second surfactant selected from the group consisting of: a sulfosuccinate, a sulfosuccinate derivative, an imidazoline, an imidazoline derivative, and a combination thereof, and
e) optionally, a foaming agent.

The alkanolamide is preferably coconut oil diethanolamide. The ethoxylated alkylphenol, ethoxylated aryl phenol, or combination thereof is preferably a nonylphenol ethoxylate. The first surfactant is preferably a C8-18 ethoxylated propoxylated alcohol. And the second surfactant is preferably an amphoteric surfactant. The composition preferably has from about 30 to about 80% by weight of an alkanolamide; from about 5 to about 20% by weight of an ethoxylated alkylphenol, ethoxylated aryl phenol, or combination thereof; from about 5 to about 20% by weight of first surfactant; from about 10 to about 30% by weight of second surfactant; and from about 0 to about 10% by weight of foaming agent.

More preferably, if the optional foaming agent is not used the composition has about 54% by weight of coconut oil diethanolamide, about 13% by weight of nonylphenol ethoxylate, about 13% by weight of C8-18 ethoxylated propoxylated alcohol, and about 20% by weight of amphoteric surfactant. If a foaming agent is added to the composition, the composition has about 54% by weight of coconut oil diethanolamide, about 8% by weight of nonylphenol ethoxylate, about 13% by weight of C8-18 ethoxylated propoxylated alcohol, about 20% by weight of amphoteric surfactant and about 5% by weight of foaming agent.

In addition, a method for forming a non-toxic composition for promoting the remediation of waste water is provided by combining coconut oil diethanolamide, a C8-18 ethoxylated propoxylated alcohol, a nonylphenol ethoxylate and an optional foaming agent to form a mixture, and adding to this mixture an amphoteric surfactant.

Further, a method for promoting the removal of contaminants from waste water is provided by adding the non-toxic composition to the waste water, wherein the composition enhances removal of the contaminants by bacteria in the waste water.

An apparatus for introducing a waste water treatment composition into a waste water system is also provided. The apparatus includes tubing for delivering the waste water treatment composition to at least one spray nozzle and a swivel fitting connecting the tubing to the spray nozzle. The spray nozzle is configured to deliver the waste water treatment composition into the waste water system, and the swivel fitting permits 360 degree rotation of the spray nozzle around the tubing.

The compositions and methods described above effectively promote the dispersion of agglomerated FOG particles, resulting in much more efficient remediation of FOG and other contaminants in the waste water.

DETAILED DESCRIPTION OF THE INVENTION

Figure 1:
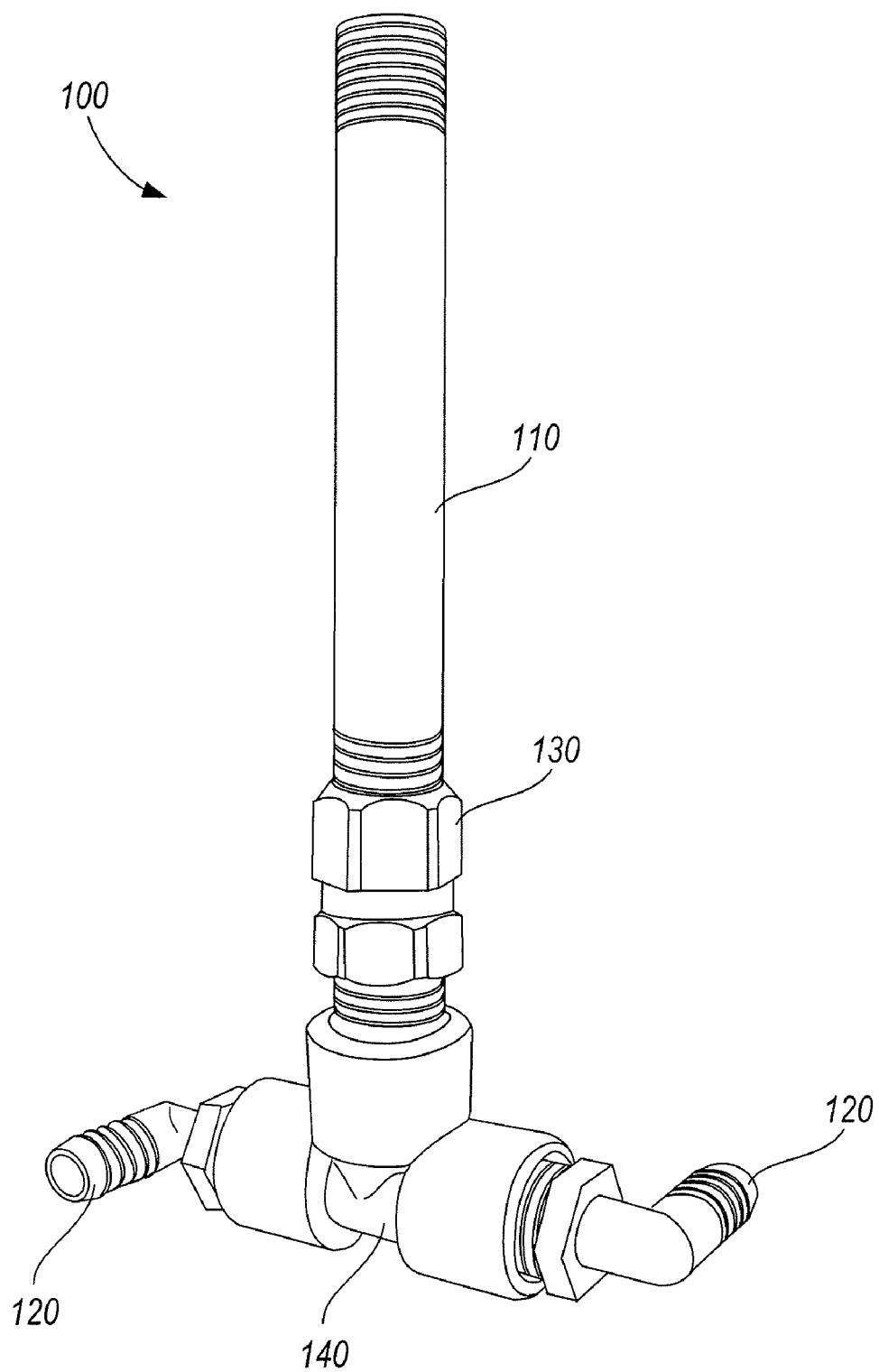
FIG. 1 is a perspective view of an apparatus according to one embodiment of the present invention.

In a preferred embodiment, an improved composition for promoting the remediation of waste water in grease trap, septic, sewer or waste water treatment system is provided. The composition is organic and non-toxic, and poses no discharge concerns. The composition is formed from the following:

a) an alkanolamide;
b) an ethoxylated alkylphenol, ethoxylated aryl phenol, or combination thereof;
c) a first surfactant selected from the group consisting of: an ethoxylated alcohol, a glycerol ester, a propoxylated fatty acid, an ethoxylated fatty acid, a propoxylated alcohol, an ethoxylated alcohol, a propoxylated alkyl phenol, an ethoxylated alkyl phenol, and a combination thereof;
d) a second surfactant selected from the group consisting of: a sulfosuccinate, a sulfosuccinate derivative, an imidazoline, an imidazoline derivative, and a combination thereof; and
e) optionally, a foaming agent.

A preferred alkanolamide is a coconut oil diethanolamide (CAS No. 8051-30-7) such as T-Tergamide™ 1CD oil, a Harcros Chemicals product (Powder Springs, Ga.).

The ethoxylated alkylphenol, ethoxylated aryl phenol or combination thereof is preferably a nonylphenol ethoxylate such as Tergitol NP-9™, Tergitol NP-9.5™, or a mixture thereof. Tergitol NP-9™ and Tergitol NP-9.5™ are products of Dow Chemicals (Midland, Mich.). More preferably, the nonylphenol ethoxylate is Tergitol NP-9™.

The first surfactant is preferably a C8-18 ethoxylated propoxylated alcohol (CAS No. 69013-18-9) such as T DET A 826, a Harcros Chemicals product.

The second surfactant is preferably an amphoteric surfactant such as Amphosol 2CSF™, Amphoterge K2™, or a mixture thereof. Amphosol 2CSF™ is a Stepan Company product (Northfield, Ill.), and has disodium cocoamphodipropionate (CAS No. 68604-71-7) as its primary active component. Amphoterge K2™ is a product of Lonza, Inc. (Basel, Switzerland), and has cocoimidazolinedicarboxylate disodium salt (CAS No. 132647-09-7) as its primary active component.

The optional foaming agent is preferably an anionic surfactant, a soap, an alkylaryl sulfonate, a betaine derivative, an ethoxylated fatty acid, or a combination thereof. More preferably, the foaming agent is a tall oil fatty acid, commonly referred to as "TOFA." The foaming agent causes the composition to expand to a foam when applied as further described herein and, in addition to having other favorable characteristics, (1) requires less composition to cover the same surface area as compared to the composition in liquid form, (2) suspends the composition in an gas-liquid mixture that increases the available surface area of the composition and thus better promotes remediation of the waste water, and (3) slows the movement of the composition down vertical surfaces, allowing the composition to remain in a desired area for longer periods of time. The foaming agent is preferred where the composition is applied above the FOG/waste water level in, e.g., a lift station. The foaming agent is not required—although could certainly still be used—when the composition is applied directly into a waste water stream.

A preferred TOFA foaming agent is T-704 or T-900, available from The Nottingham Company (Atlanta, Ga.). Other TOFA foaming agents can be used, including, but not limited to: Sylfat FA-1™ Special; Sylfat FA-2™; Sylvatal D25LR™; Sylvatal D30E™; Sylvatal D30LR™; Sylvatal D40LR™; and Sylvatal S40™. These alternative TOFA foaming agents are available from Arizona Chemical Company (Jacksonville, Fla.).

It is noted that one or more of the other materials of the composition may cause foaming of the composition to some degree when the composition is applied in a spray or mist form described herein. The quality of the foam has been found to be superior when T-704 or T-900 is added to the composition, although it is certainly possible that other foaming agents described herein or elsewhere will provide desirable foam qualities. Foam "quality" can be measured in a variety of ways, but will be described herein in terms of "blow rate" and "melt time." Blow rate is the volumetric ratio of wet foam to composition, i.e., the number of ounces of wet foam that can be formed from one ounce of composition. Melt time is the amount of time that it takes the wet foam to melt back to its liquid form.

Preferably, the composition has from about 30 to about 80% by weight of alkanolamide, from about 5 to about 20% by weight of ethoxylated alkylphenol, ethoxylated aryl phenol or combination thereof, from about 5 to about 20% by weight of first surfactant, from about 10 to about 30% by weight of second surfactant, and from about 0 to about 10% by weight of foaming agent.

More preferably, if a separate foaming agent is not added to the composition, the composition has about 54% by weight of coconut oil diethanolamide, about 13% by weight of nonylphenol ethoxylate, about 13% by weight of C8-18 ethoxylated propoxylated alcohol, and about 20% by weight of amphoteric surfactant. If a foaming agent is added to the composition, the composition has about 54% by weight of coconut oil diethanolamide, about 8% by weight of nonylphenol ethoxylate, about 13% by weight of C8-18 ethoxylated propoxylated alcohol, about 20% by weight of amphoteric surfactant and about 5% by weight of foaming agent.

The composition preferably has a relatively neutral pH of about 7.5 to about 9. If addition of the foaming agent causes the pH of the composition to decrease below this preferred range, a known pH balancer such as triethanolamine (TEA) can be added. Decreasing the concentration of the foaming agent in the composition to about 4% by weight and adding about 1% by weight TEA has provided favorable pH results.

It has been determined that when the composition described above is mixed with waste water containing relatively large FOG particles—and other contaminants entrained within these large FOG particles—the composition effectively breaks down these large FOG particles into much smaller particles, dramatically increasing the surface area of the FOG particles and releasing other entrained contaminants. The composition thus enhances the remediation of fat, oil, grease and other contaminants in the waste water by allowing active biological material—such as bacteria—to contact and remediate previously trapped FOG and other contaminant particles.

More particularly, it is believed that the composition couples with the FOG molecule, making it water soluble by changing its polarity. Then, with the water in the waste stream acting as a delivery agent, the coupled composition and FOG molecule are dispersed throughout the waste stream. The composition accelerates the activity of existing bacteria by making the FOG and other contaminants more accessible, binding and stabilizing the FOG/contaminants until they are digested by the naturally occurring bacteria which are drawn to the polarized molecule. The naturally occurring bacteria in the waste water will increase as their available "food" source increases due to the increased surface area for biological activity. A softball-sized agglomeration of FOG, for example, represents the equivalent of approximately 27 square inches of surface area. The composition described herein breaks apart this agglomeration, making the FOG water-soluble and dispersing it throughout the waste stream, thereby increasing the effective surface area for biological remediation by a factor of about a billion.

In addition, unlike other enzyme/bacteria products that are inhibited or destroyed by accidental petroleum hydrocarbon introduction, the composition described above is unaffected by such accidental introduction. The composition reacts to petroleum hydrocarbons in a similar manner as it would to animal and vegetable hydrocarbons.

The composition is believed to improve activity of all phases of a waste water treatment plant, without any detrimental results in any phase when used as directed. Moreover, the composition has both anionic and cationic components, is organic in nature, non-toxic, biodegradable and environmentally safe, and meets the criteria for a degradable product as determined by a modified sturm test (40 C.F.R. 796.3260). The carbon-based organic composition serves as a nutrient source for the resident bacteria in the waste water.

As discussed in more detail in the examples provided herein, the composition has been successfully tested in lift station applications. In typical lift station applications, the composition is preferably introduced in the lift station at a concentration of about 1 to about 15 ppm in the raw sewage, more preferably about 5 to about 10 ppm, and most preferably about 7 ppm. Thus, about 7 gallons of the composition are preferably added to the lift station for every 1 million gallons of sewage flowing through the lift station.

In addition, laboratory testing has demonstrated that the composition is effective at breaking up and dispersing "grease balls" and reducing the concentration of grease in the subnatant liquid. As set forth below, the composition was also found to be completely non-toxic and to have minimal long-term impact on the activated sludge process, as measured by supernatant turbidity, total suspended solids ("TSS"), $BOD_5$ (a measure of biological oxygen demand), and sludge settling rate. Moreover, the composition was analyzed with conventional surfactant detection tests with negative results.

In another embodiment, a method for forming a non-toxic composition for promoting the remediation of waste water is provided by combining the alkanolamide, the first surfactant, the ethoxylated alkylphenol, ethoxylated aryl phenol or combination thereof, and an optional foaming agent to form a mixture, and adding to this mixture the second surfactant. The second surfactant should be added to the mixture slowly so as to prevent gelling of the composition.

Preferably, the composition formed from this method has from about 30 to about 80% by weight of alkanolamide, from about 5 to about 20% by weight of ethoxylated alkylphenol, ethoxylated aryl phenol or combination thereof, from about 5 to about 20% by weight of first surfactant, from about 10 to about 30% by weight of second surfactant, and from about 0 to about 10% by weight of foaming agent.

More preferably, if a separate foaming agent is not added to the composition, the composition formed from this method has about 54% by weight of coconut oil diethanolamide, about 13% by weight of nonylphenol ethoxylate, about 13% by weight of C8-18 ethoxylated propoxylated alcohol, and about 20% by weight of amphoteric surfactant.

If a foaming agent is added to the composition, the composition formed from this method has about 54% by weight of coconut oil diethanolamide, about 8% by weight of nonylphenol ethoxylate, about 13% by weight of C8-18 ethoxylated propoxylated alcohol, about 20% by weight of amphoteric surfactant and about 5% by weight of foaming agent. As discussed above, a pH balancer such as TEA can optionally be added to the composition. If a pH balancer is used, about 1% by weight of foaming agent is preferably replaced with about 1% by weight of pH balancer.

In a further embodiment, a method for promoting the removal of contaminants from waste water is provided by adding the non-toxic composition to the waste water, wherein the composition enhances removal of the contaminants by bacteria in the waste water.

The non-toxic composition that is formed by the method described above is particularly viscous, and the composition is preferably diluted with a diluent prior to adding the composition to the waste water in order to allow the composition to more easily mix with the waste water. A preferred diluent is water, although other non-toxic inactive liquids could be selected. The composition is preferably diluted to a concentration of from about 0.05% to about 10% prior to adding the composition to the waste water. More preferably, the composition is diluted to a concentration of from about 1% to about 5%. Most preferably, the composition is diluted to a concentration of 2%. Concentrations of greater than about 10% can be used for particularly large or stubborn FOG formations, although it is desirable to use no more than the composition as is necessary to break up the FOG so as to minimize the amount of composition used and reduce the overall cost of the treatment. In some instances, however, it will be desirable to apply the composition directly to large FOG agglomerations, also known as "cakes," in order to more quickly cause the cake to break up. If the cake is relatively dry, it may be preferable to apply water to the top of the cake a few hours or days before applying the composition in order to soften the cake and enhance the effectiveness of the composition.

In some applications it may be desirable to apply the waste water treatment composition over a large exposed area. For example, it is not uncommon for an untreated lift station to develop a thick cake of FOG above the waste water layer. Frequently, the FOG also covers floats, switches and similar equipment. When floats, switches and the like become covered in FOG the lift station may not operate properly—these indicators provide improper readings and the liquid level in the lift station may not be properly controlled by the lift station pump or pumps. Moreover, if these indicators are inoperative the lift station pumps could run dry, causing damage to the pumps. It is therefore desirable to treat the walls of the lift station, and the associated lift station components, with a waste water treatment composition in order to facilitate breakup of the FOG covering the walls of the lift station and its components. Overhead drip and spray systems can be utilized to deliver a waste water treatment composition to the lift station and these components, but such systems may not be effective in covering all affected lift station components.

Figure 2:
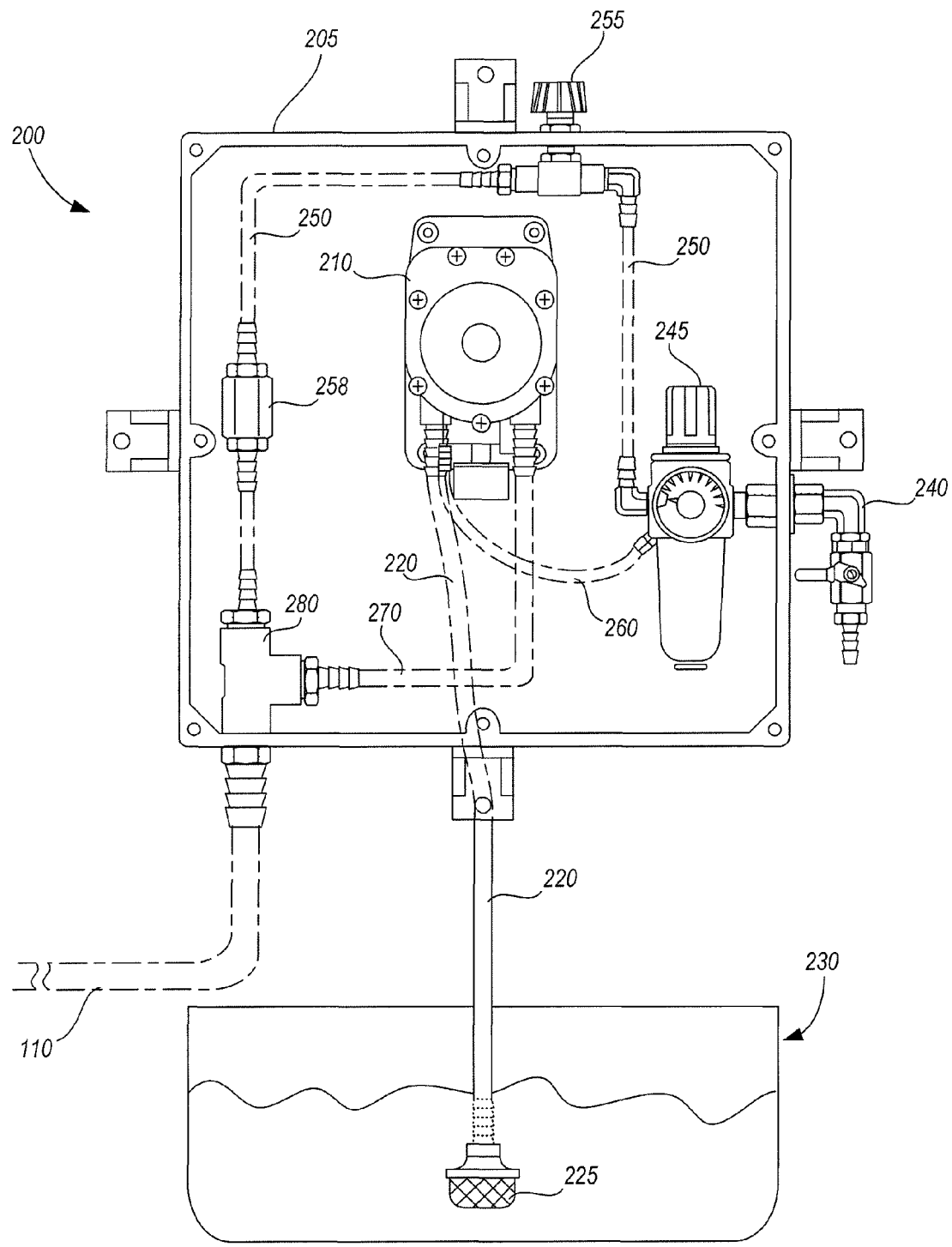
FIG. 2 is a front view of an apparatus according to another embodiment of the present invention.

In such cases it may be desirable to use an apparatus, illustrated in FIGS. 1 and 2, for delivering a waste water treatment composition to the waste water system, and in particular to a lift station and its associated components. FIG. 1 illustrates an apparatus 100 for delivering the waste water treatment composition, and in particular the waste water treatment composition described more specifically herein. Apparatus 100 includes tubing 110 for delivering a waste water treatment composition to at least one spray nozzle 120. As depicted in the drawing, tubing 110 is connected to swivel fitting 130, which is connected to tee 140. Tee 140 allows for the waste water treatment composition to be distributed to spray nozzle 120. Although two spray nozzles 120 are illustrated in the drawing, it will be understood by a skilled artisan that one, three, four or any other suitable number of spray nozzles could be utilized to deliver a waste water treatment composition into a waste water system.

Tubing 110 can be any material capable of delivering a waste water treatment composition to spray nozzle 120 through swivel fitting 130 and tee 140. Preferably, tubing 110 is PVC or stainless steel piping. Stainless steel provides weight and stiffness to the apparatus to minimize vibration of the apparatus during operation. In a preferred embodiment, tubing 110 has at least two sections with different materials (not illustrated): a length of stainless steel tubing connected to swivel fitting 130, with a second length of PVC tubing connected to the other end of the stainless steel tubing and leading out of the lift station. The tubing can be sized to deliver a desired amount of waste water treatment composition to the waste water system; in one embodiment ½-inch inside diameter tubing is utilized.

Swivel fitting 130 is connected on one end to tubing 110 and on the other end to optional tee 140. Swivel fitting 130 allows tee 140 and spray nozzle 120 to rotate 360 degrees around tubing 110 during operation. The force of the waste water treatment composition exiting spray nozzle 120 imparts a rotational force on the lower portion of swivel fitting 130, causing tee 140 and spray nozzle 120 to rotate around tubing 110. The greater the exit velocity of the waste water treatment composition from spray nozzle 120, the faster tee 140 and spray nozzle 120 will rotate around tubing 110. Swivel fitting 130 is preferably stainless steel to minimize wear on the rotating parts, though any suitable material can be used.

Optional tee 140 is a simple "T" junction. As depicted in FIG. 1, it has an inlet port connected to swivel fitting 130 and two outlet ports, each outlet port connected to spray nozzle 120. Tee 140 allows for a relatively even distribution of waste water treatment composition to each spray nozzle 120. Tee 140 can be formed from any suitable material. As there is minimal wear to this component, PVC is preferable for its relatively low cost and light weight as compared to stainless steel.

As discussed above, apparatus 100 can include any number of spray nozzles. If only one spray nozzle 120 is used, then tee 140 is not necessary and the spray nozzle 120 can be connected directly to swivel fitting 130. If more than two spray nozzles 120 are used, then tee 140 should have an outlet port for each spray nozzle. For the reasons discussed below, however, it is preferable that the outlet ports are evenly distributed about the vertical axis of tee 140.

Spray nozzle 120 can be formed from any suitable material, including, but not limited to, stainless steel and PVC. As illustrated in FIG. 1, spray nozzle 120 includes an inlet port connected to tee 140 or swivel fitting 130 (if only one spray nozzle is used) and an outlet port for dispersing a waste water treatment composition into a waste water system. The outlet port can have any suitable configuration for dispersing the composition and can be adjusted for a desirable spray pattern by known methods.

Apparatus 100 preferably has at least two spray nozzles 120. If only one spray nozzle is used, the force of waste water treatment composition exiting the outlet port of the spray nozzle may cause undesirable vibration, or "shimmy" of the apparatus in the waste water system—unless, of course, the apparatus is securely fastened within the waste water system. By using two or more spray nozzles the rotational forces offset each other and vibration is minimized.

In addition, the materials of construction of the components of the apparatus 100 can be adjusted to minimize vibration and shimmy effects. For example, where the apparatus is to be installed in a particularly deep lift station or waste water system component it may be desirable to use all stainless steel tubing 110 and other components for added weight and stability. For shallower lift stations or waste water system components, or where vibration is not as much of a concern, it may be preferable to use PVC for more of the components.

When used in a lift station, apparatus 100 and spray nozzle(s) 120 are preferably located above "high tide" of the waste water in the lift station. It has been found to be particularly preferable to locate spray nozzle(s) 120 approximately 18 inches above high tide. The waste water treatment composition can be delivered in a continuous discharge or in a batch treatment, depending on the treatment needs of the lift station.

FIG. 2 illustrates an apparatus 200 for delivering a waste water treatment composition to spray apparatus 100. Apparatus 200 includes a cabinet 205 housing pump 210, air pressure regulator 245, and other system components. A preferable source for the apparatus depicted in FIG. 2 is the Foam-It Wall™ foamer, a product of Innovated Cleaning Equipment, Inc. of Grand Rapids, Mich.

Pump 210 is configured to pump a waste water treatment composition from tank 230 through strainer 225 and tubing 220. The outlet of pump 210 delivers the waste water treatment composition to tee 280 through tubing 270. Pump 210 is preferably air-driven, since such pumps, unlike liquid-driven pumps, can run dry for several days without damaging the pump. Line 260 provides blow-back or pressure relief protection to pump 210.

Compressed air is preferably delivered from an air supply connected at line 240 through regulator 245, line 250, adjustable valve 255 and check valve 258 to tee 280, where it mixes with the waste water treatment composition delivered from tubing 270. The outlet of tee 280, containing compressed air and the waste water treatment composition, is delivered to apparatus 100 through tubing 110, as discussed above.

Regulator 245 and adjustable valve 255 can be manipulated to provide the desired air/composition mix for delivery to the waste water system. The air pressure delivered to tee 280 is preferably at least about 20 pounds per square inch (psi), more preferably about 40-60 psi, and most preferably about 50 psi. These air pressures cause a waste water treatment composition, and in particular the waste water treatment composition described herein, to exit spray nozzles 120 in the form of a thick foam that is effective at coating waste water system components, and in particular lift station components such as lift station walls, switches, floats and the like as described herein. As discussed, the waste water treatment composition described herein is naturally foaming. Even without the optional foaming agent described herein, over 175 cubic feet of foaming waste water treatment composition can be delivered to a lift station with as little as one gallon of waste water treatment composition. If the optional foaming agent is added to the composition the amount of foam delivered can be substantially increased and the quality of the foam is better. Blow rates of 5:1 to about 50:1 can be achieved and are preferred. Blow rates of 15:1 to 20:1 are more preferable. Melt rates of about 10 to about 50 minutes can be achieved and are preferred, with about 30 minutes being more preferable.

The methods described herein have been shown to be effective for enhancing the remediation of contaminants such as fat, oil and grease from waste water. In addition, it is anticipated that the method would be effective for enhancing remediation of numerous other contaminants, such as steroid compositions (e.g., estrogens), surfactants (e.g., alkyl phenol ethoxylates), pesticides, herbicides and fungicides (e.g., DDT, dieldrin, and 2,4D), polyaromatic compounds (e.g., polychlorinated biphenyls (PCBs), polycyclic aromatic hydrocarbons (PAHs), and brominated flame retardants), and/or organic oxygen compounds (e.g., phthalates, dioxins and bisphenol A). Many of these contaminants are of particular concern to the U.S. Environmental Protection Agency (EPA) due to their proliferation in modern waste water systems and their impact on marine life as well as land-applied sludge, which could eventually enter the food chain as an unwanted and possibly toxic element. It is believed that by mixing the composition described herein with waste water, relatively large FOG particles, and other contaminants entrained within these large FOG particles, are exposed to bacteria in the waste water, which remediate the FOG particles and contaminants. The composition described herein is effective at breaking down these large FOG particles into much smaller particles and releasing other entrained contaminants, thereby enhancing the remediation of these contaminants in the waste water.

In addition to its use in grease trap, septic, sewer and waste water treatment systems, the composition described above has a wide range of industrial, commercial and residential uses. Such uses include general cleaning of carpet and upholstery as well as spot and/or stain removal, general purpose cleaning/degreasing, a soil softener for hard soils near, e.g., particulate build-up around sprinklers on golf courses and anywhere that water-borne particulate may accumulate, an automatic dish washing liquid for high-temperature industrial/commercial or standard residential dishwashers, a kitchen hood cleaner, a laundry additive, spotter or soaker, a dish/glass cleaner, and a tile/grout cleaner. The waste water treatment composition, systems, components and methods described herein could also be used in other applications, such as in treating oil spills or in maintaining reservoirs free from fat, oil or grease.

The compositions, methods and apparatuses described above will be further understood with reference to the following non-limiting examples.

Example 1

A composition having about 54% by weight of T-Tergamide 1CD, about 13% by weight of Tergitol NP-9, about 13% by weight of T DET A 826 and about 20% by weight of Amphosol 2CSF was prepared by mixing T-Tergamide 1CD, Tergitol NP-9 and T DET A 826, and then slowly adding Amphosol 2CSF to this mixture. Approximately 1.25 gallons of this composition was diluted in a 55-gallon drum with 53.75 gallons of water, such that the concentration of the composition in the drum was approximately 2%.

Example 2

A lift station approximately 12 feet by 30 feet in size, with a volume of 1.5 million gallons a day, had a 12-inch cake of grease and other solids covering its entire surface, corresponding to a volume of approximately 360 cubic feet of grease and solids. The lift had very low velocity and almost no turbulence of the contents. When the lift was pumped down, a "shoe" of grease extended from the wall approximately 12 inches around the perimeter at the high water mark. Floats and other equipment in the station were covered with grease. Due to the design of the pumps, they required 3 feet of head above their top, and as a result a complete pump-down to rid the lift of loosened FOG, solids and accumulated latex was not possible. Strong odors in the vicinity of the lift station resulted in numerous complaints from nearby residents.

The composition of Example 1 was applied approximately daily for a 28-day trial period, first at a hatch at the outflow end of the lift and then, when it appeared that the composition was not reaching the lift station, at a manhole cover approximately 30 feet upstream of the lift station. For the first 6 days approximately 15 gallons of the diluted composition of Example 1 were applied daily, for the next 6 days approximately 10 gallons a day were applied, and for the final 14 days approximately 5 gallons a day were applied.

By the end of the trial period, the crust of grease and solids was down to approximately 10% of its original size, and the remaining grease and solids were soft and mushy. Lift operators remarked that the lift had not previously been as free of grease and odors without a substantial investment of labor and equipment.

Example 3

A lift with a diameter of approximately 5 feet and a volume of 2 million gallons a day had a 39-inch cake-covered well, corresponding to a volume of approximately 64 cubic feet of grease and solids. Three high-velocity lines with 8 inch diameters entered the lift at varying heights, providing for turbulent flow. The station had grease accumulation on the walls, ladder, float switches, and other station components, as well as a "shoe" around the perimeter of the lift.

The composition of Example 1 was applied directly to the cake approximately daily for a 29-day trial period. For the first 10 days approximately 20 gallons of the diluted composition of Example 1 were applied daily, for the next 9 days approximately 15 gallons a day were applied, and for the final 10 days approximately 5 gallons a day were applied.

Within five days of beginning the trial, the cake was nearly gone. No odors were detected at the station other than a slight, non-offensive, "dirty dish water" scent. For the remainder of the trial period, the diluted composition was applied for system maintenance. It was believed that the turbulence in the lift contributed to optimal mixing of the composition in the lift and to the ultimate removal of the FOG from the lift station.

Example 4

The trials in Examples 2 and 3 showed substantial improvement in grease and solid control over prior compositions, systems and methods. Previously, the lift stations would have required manual cleaning by several maintenance personnel working for several hours and wearing Personal Protection Equipment (PPE). In addition, hundreds of thousands of dollars in vacuum and high pressure washing equipment would have been required. As a result of poor access conditions, there would have been substantial safety concerns. Moreover, it would have been necessary to collect and properly dispose of all of the debris removed during the manual cleaning process.

By using the composition of Example 1, it was possible for a single operator, in just a few minutes a day, to eliminate these labor and equipment requirements, resulting in a substantial cost savings to the owners and/or operators of the affected systems. Maintenance personnel were not required to wear PPE, since no physical access to the lift station was required (the composition could be applied through vent holes or access hatches), and no adverse impact to the waste water treatment systems downstream of these lift stations was observed. The composition described herein could also be applied with an automated dispensing system, eliminating the need for daily operator application of the composition.

Example 5

Grease Dispersion Tests

In Grease Dispersion Tests #1, 8.4 mg/L of the composition described above in Example 1 was added to a sample of raw waste water with grease balls covering the surface of the sample and subjected to a non-vigorous mechanical mixing environment. After about one hour, the grease balls began to soften and the outer layers separated from the ball. Moreover, the grease in the subnatant liquid (i.e., the liquid beneath the surface of the floating grease balls) was reduced from 68 mg/L to 45 mg/L.

In Grease Dispersion Test #2, the composition described above in Example 1 was added to a sample of raw waste water at a concentration of 400 mg/L and subjected to a vigorous mixing environment and aeration. The grease balls were completely dispersed into the waste water. The resulting waste water did not resemble an emulsion—in which the oil is chemically suspended in the water—but instead more closely resembled a colloidal-type suspension in which the grease and oil particles were suspended by Brownian motion.

One observation from this test is that the more vigorous the mixing, the more effective the composition is at breaking up the FOG particles. This is believed to be due to two major factors: (1) more vigorous mixing increases the likelihood and rate of contact between the composition and FOG particles; and (2) more vigorous mixing provides energy more quickly to separate the small, dispersed FOG particles from the outer layers of the larger grease balls or chunks of grease. This conclusion is supported by tests conducted on operating lift stations, where it has been observed that the composition breaks up FOG agglomerations substantially more rapidly where the agglomerations are located in high turbulence areas.

Example 6

Surfactant Tests

The composition described above in Example 1 was added to tap water to a concentration of 8.4 mg/L and were tested for oil and grease, MBAS-type surfactants and CTAS surfactants. All tests were negative for the presence of these materials.

Example 7

Activated Sludge Tests

Turbidity, TSS, $BOD_5$, Oil and Grease, Sludge Settleability, and Toxicity

Two samples (one test and one blank) of conventional activated sludge mixed liquor solids were prepared. The composition described above in Example 1 was added to the test sample to a concentration of about 34 mg/L and aerated. The concentration of oil and grease in the sample was about 16 mg/L. It is noted that this concentration of about 34 mg/L is almost five times greater than the preferred concentration of about 7 mg/L.

After 20 minutes of aeration, turbidity of the supernatant in the test sample was elevated at about 24.9 NTU, with the blank sample having a turbidity of 1.24 NTU. After 5 hours, the turbidity of the supernatant in the test sample was 5.08 NTU and that of the blank was 1.66 NTU. After 3 days of aeration the test sample turbidity had further decreased to 2.69 NTU and the blank remained relatively steady at 1.77 NTU.

Activated sludge supernatant turbidity thus increased initially as a result of the added composition and the resultant suspension of oil and grease in the sample. The turbidity rapidly decreased, however, as the colloidal suspension of composition/oil and grease particles were remediated by the activated sludge microorganisms, reducing the supernatant turbidity to nearly the levels observed in the blank.

Similarly, total suspended solids (TSS), biological oxygen demand over a 5-day decomposition period ($BOD_5$), and oil and grease content were not adversely affected by the presence of the composition in the waste water. After 5 hours of aeration and 30 minutes of settling, supernatant turbidity in the test sample was 36 mg/L as compared to 22 mg/L in the blank. Supernatant $BOD_5$ in the test sample was 13 mg/L as compared to <5 mg/L in the blank (below the detection limit of 5 mg/L). Oil and grease content of both the test and blank samples were less than the detection limits of 6 mg/L and 7 mg/L, respectively. The slight increase in TSS and $BOD_5$ is not a substantial increase that would adversely affect the activated sludge process.

Sludge settleability was also compared between the test and blank samples, with the test sample showing essentially identical, if not slightly better, settling characteristics than the blank sample. The composition appeared to break down the grease such that the resulting colloidal suspension of composition and grease biodegrades more easily than the undispersed grease. Moreover, the combined suspension did not appear to exert the low specific gravity phenomenon that is often associated with grease entrained in activated sludge.

Finally, toxicity of the test and blank samples was analyzed, with the test sample having a concentration the composition of about 22 mg/L. The test sample and blank were aerated for 69 hours and the samples were then allowed to settle for 30 minutes. Samples of the supernatant for both tests were collected and sent to a laboratory for testing of toxicity using ceriodaphnia dubia following the procedure and protocol set forth in *Methods for Measuring the Acute Toxicity of Effluents and Receiving Waters to Freshwater and Marine Organisms*, $5^{th}$ Ed., October 2002, EPA-821-R-012. The supernatant for the test sample and blank were tested utilizing supernatant sample concentrations of 6.25%, 12.5%, 25%, 50% and 100%, and a control of 100% dilution water. Neither of the test or blank samples indicated any toxicity, up to and including 100% of the test sample.

Example 8

The equipment described in FIGS. 1 and 2 was tested in lift station operations with unexpectedly favorable results. A spinning head apparatus 100 according to FIG. 1, connected to a mist machine 200 according to FIG. 2, delivered a waste water treatment composition according to Example 1 to a lift station that had a preexisting FOG layer approximately 2-feet thick. The equipment removed the FOG layer in about 10 days, which was about 80% faster than other tested methods of delivering the waste water treatment composition. In addition, the FOG layer was removed using only about 25% of the waste water treatment composition as was needed for previously tested methods of delivery.

The foregoing is provided for the purpose of illustrating, explaining and describing embodiments of the present invention. Further modifications and adaptations to these embodiments will be apparent to those skilled in the art and may be made without departing from the spirit of the invention or the scope of the claims.

What is claimed is:

1. A method for promoting the remediation of contaminants from waste water, comprising adding a non-toxic composition comprising:

a) an alkanolamide;

b) an ethoxylated alkylphenol, ethoxylated aryl phenol or a combination thereof;

c) a first surfactant selected from the group consisting of an ethoxylated alcohol, a glycerol ester, a propoxylated fatty acid, an ethoxylated fatty acid, a propoxylated alcohol, an ethoxylated alcohol, a propoxylated alkyl phenol, an ethoxylated alkyl phenol, and a combination thereof; and d) a second surfactant selected from the group consisting of a sulfosuccinate, a sulfosuccinate derivative, an imidazoline, an imidazoline derivative, and a combination thereof to the waste water, wherein the composition enhances remediation of the contaminants by bacteria in the waste water.

2. The method of claim 1, wherein the composition is diluted with a diluent to a concentration of from about 0.05% to about 10% prior to adding the composition to the waste water.

3. The method of claim 1, wherein the composition is added to the waste water in an aerosolized form.

4. A method for promoting the remediation of contaminants from waste water, comprising adding a non-toxic composition comprising:

a) an alkanolamide;

b) an ethoxylated alkylphenol, ethoxylated aryl phenol or a combination thereof;

c) a first surfactant selected from the group consisting of an ethoxylated alcohol, a glycerol ester, a propoxylated fatty acid, an ethoxylated fatty acid, a propoxylated alcohol, an ethoxylated alcohol, a propoxylated alkyl phenol, an ethoxylated alkyl phenol, and a combination thereof;

d) a second surfactant selected from the group consisting of a sulfosuccinate, a sulfosuccinate derivative, an imidazoline, an imidazoline derivative, and a combination thereof; and e) a foaming agent to the waste water, wherein the composition enhances remediation of the contaminants by bacteria in the waste water.

* * * * *